US012589533B2

(12) United States Patent
Namiki et al.

(10) Patent No.: US 12,589,533 B2
(45) Date of Patent: Mar. 31, 2026

(54) MOLDED FOAM MANUFACTURING APPARATUS AND SCREW FOR MOLDED FOAM MANUFACTURING APPARATUS

(71) Applicants: SANKEI GIKEN KOGYO CO., LTD., Tokyo (JP); Nihon Yuki Co., Ltd., Sagamihara (JP); SHIBAURA MACHINE CO., LTD., Tokyo (JP)

(72) Inventors: Kazuya Namiki, Isesaki (JP); Hirofumi Ichikawa, Sagamihara (JP); Ikuro Tanaka, Numazu (JP)

(73) Assignees: SANKEI GIKEN KOGYO CO., LTD., Tokyo (JP); Nihon Yuki Co., Ltd., Sagamihara (JP); SHIBAURA MACHINE CO., LTD., Tokyo (JP)

( * ) Notice: Subject to any disclaimer, the term of this patent is extended or adjusted under 35 U.S.C. 154(b) by 65 days.

(21) Appl. No.: 18/710,463

(22) PCT Filed: Oct. 24, 2022

(86) PCT No.: PCT/JP2022/039492
§ 371 (c)(1),
(2) Date: May 15, 2024

(87) PCT Pub. No.: WO2023/090061
PCT Pub. Date: May 25, 2023

(65) Prior Publication Data
US 2025/0001658 A1      Jan. 2, 2025

(30) Foreign Application Priority Data

Nov. 19, 2021      (JP) ................................. 2021-188602

(51) Int. Cl.
B29C 44/42      (2006.01)
B29C 44/00      (2006.01)
(Continued)

(52) U.S. Cl.
CPC ............ *B29C 44/425* (2013.01); *B29C 44/00* (2013.01); *B29C 44/08* (2013.01);
(Continued)

(58) Field of Classification Search
CPC ........ B29C 44/3446; B29B 7/42; B29B 7/429
See application file for complete search history.

(56) References Cited

U.S. PATENT DOCUMENTS 3,685,804  A  *  8/1972  Stansfield ................. B29B 7/86
366/89
4,136,969  A  *  1/1979  Meyer ................... B29C 48/686
366/322
(Continued)

FOREIGN PATENT DOCUMENTS

CN          207901640 U      9/2018
JP          54-15961 A      2/1979
(Continued)

OTHER PUBLICATIONS

International Search Report dated Jan. 10, 2023, issued in counterpart International Application No. PCT/JP2022/039492. (2 pages).

*Primary Examiner* — Benjamin A Schiffman
(74) *Attorney, Agent, or Firm* — WHDA, LLP

(57)      ABSTRACT

A molded foam manufacturing apparatus 1 includes a cylinder 2 in which a plasticization zone 21 where a thermoplastic resin is plasticized and melted, a starvation zone 22 where the molten resin is put into a starvation state and an injected physical foaming agent is dissolved in the molten resin, and a feeding zone 23 where the molten resin in which the physical foaming agent is dissolved is compressed and metered are provided in this order from an upstream side, and a screw 3 that is installed inside the cylinder 2 so as to be freely rotatable around an axis of the cylinder and has flights formed in a spiral shape on an outer circumference of a shaft 31, wherein a lead angle R of the flights of the screw
(Continued)

21

3 corresponding to the feeding zone 23 is set smaller than a lead angle α of the flight corresponding to the starvation zone 22, and the number of pieces of the flight of the screw 3 corresponding to the feeding zone 23 is set smaller than the number of pieces of the flight corresponding to the starvation zone 22. In this way, it is possible to prevent a decrease in the flow rate of the molten resin transported in the starvation zone and the feeding sone and manufacture high-quality molded foams with high production efficiency.

10 Claims, 4 Drawing Sheets

(51) Int. Cl.

| | | |
|---|---|---|
| *B29C 44/08* | (2006.01) | |
| *B29C 44/34* | (2006.01) | |
| *B29C 44/36* | (2006.01) | |
| *B29C 44/58* | (2006.01) | |
| *B29C 45/00* | (2006.01) | |
| *B29C 45/47* | (2006.01) | |
| *B29C 45/50* | (2006.01) | |

(52) U.S. Cl.
CPC .......... *B29C 44/3446* (2013.01); *B29C 44/36* (2013.01); *B29C 44/422* (2013.01); *B29C 44/585* (2013.01); *B29C 45/00* (2013.01); *B29C 45/47* (2013.01); *B29C 45/50* (2013.01)

(56) References Cited

U.S. PATENT DOCUMENTS

| | | | | |
|---|---|---|---|---|
| 4,227,870 A | * | 10/1980 | Kim | ........................ B29B 7/429 |
| | | | | 425/208 |
| 4,255,379 A | | 3/1981 | Frankland, Jr. | |
| 4,330,214 A | * | 5/1982 | Willert | .................... B29C 48/65 |
| | | | | 366/78 |
| 4,872,761 A | * | 10/1989 | Geyer | ........................ B29B 7/42 |
| | | | | 425/208 |
| 5,127,741 A | * | 7/1992 | Capelle | .................... B29C 48/67 |
| | | | | 366/89 |
| 5,356,208 A | * | 10/1994 | Tadmor | .................... B29B 7/429 |
| | | | | 366/89 |
| 6,988,821 B2 | * | 1/2006 | Dray, Sr. | ................. B29B 7/421 |
| | | | | 366/89 |
| 9,463,581 B2 | * | 10/2016 | Yamaguchi | ........... B29C 48/832 |
| 9,669,573 B2 | * | 6/2017 | Kariya | .................... B29C 45/50 |
| 10,220,544 B2 | * | 3/2019 | Sawa | ..................... B29C 48/251 |
| 10,703,029 B2 | * | 7/2020 | Yamamoto | .............. B29C 44/42 |
| 11,504,891 B2 | * | 11/2022 | Naito | ...................... B29C 44/35 |
| 11,648,713 B2 | * | 5/2023 | Yusa | ................... B29C 44/0415 |
| | | | | 264/50 |
| 2002/0017734 A1 | * | 2/2002 | Sugihara | .............. B29D 35/148 |
| | | | | 521/82 |
| 2007/0182048 A1 | * | 8/2007 | Ogawa | .................... B29C 44/58 |
| | | | | 264/45.9 |
| 2010/0098805 A1 | * | 4/2010 | Vykhodtsev | .......... A23L 33/135 |
| | | | | 426/18 |
| 2018/0117823 A1 | * | 5/2018 | Yusa | ........................ B29C 45/18 |
| 2018/0354181 A1 | * | 12/2018 | Kazmer | ............... B29C 48/507 |
| 2022/0134626 A1 | * | 5/2022 | Gneuss | ................... B29C 48/52 |
| | | | | 366/75 |
| 2022/0402177 A1 | * | 12/2022 | Naito | ................. B29C 45/1701 |
| 2023/0075388 A1 | * | 3/2023 | Sato | ..................... B29C 48/022 |

FOREIGN PATENT DOCUMENTS

| | | | | |
|---|---|---|---|---|
| JP | 6570582 B2 | | 9/2019 | |
| JP | 2020032547 A | * | 3/2020 | ......... B29C 44/3446 |
| JP | 2021024240 A | * | 2/2021 | |
| JP | 2021024241 A | * | 2/2021 | |
| JP | 2021122843 A | * | 8/2021 | |
| WO | 2019/017293 A1 | | 1/2019 | |
| WO | WO-2019111890 A1 | * | 6/2019 | ............ B29C 45/60 |
| WO | WO-2020045265 A1 | * | 3/2020 | ......... B29C 44/3446 |
| WO | 2020/184486 A1 | | 9/2020 | |

* cited by examiner

Fig. 4

| | Inner diameter of cylinder [mm] | Flight type | Feeding zone | | | Gradual change zone Section length [mm] | Starvation zone | | | Limited amount of resin supply | Foam cell size [μm] |
| | | | Number of pieces | Lead angle [deg] | Section length [mm] | | Number of pieces | Lead angle [deg] | Section length [mm] | | |
|---|---|---|---|---|---|---|---|---|---|---|---|
| Example 1 | 56 | Gradual Change | 2 | 30 | 195 | 101 | 4 | 49 | 355 | 0% | 22 (○) |
| Example 2 | 80 | Gradual Change | 2 | 30 | 310 | 144 | 4 | 49 | 507 | 0% | 25 (○) |
| Comparative Example 1 | 56 | Constant | 4 | 49 | 195 | / | 4 | 49 | 456 | 0% | 41 (×) |
| Comparative Example 2 | 56 | Constant | 4 | 49 | 195 | / | 4 | 49 | 456 | -25% | 26 (○) |

MOLDED FOAM MANUFACTURING APPARATUS AND SCREW FOR MOLDED FOAM MANUFACTURING APPARATUS

TECHNICAL FIELD

The present invention relates to a screw-type molded foam manufacturing apparatus and a screw for the molded foam manufacturing apparatus.

BACKGROUND ART

Conventionally, as a manufacturing apparatus for manufacturing molded foams, there is known an injection molding machine in which a screw is installed inside a cylinder so as to be freely rotatable around an axis of the cylinder and freely movable forward and backward in an axial direction, and a plasticization zone where a thermoplastic resin is plasticized and melted into a molten resin, a starvation zone where the density of the molten resin is lowered to enter a starvation state and a physical foaming agent injected under pressure is dissolved in the molten resin, and a feeding zone where the molten resin in which the physical foaming agent is dissolved is compressed and metered are provided in this order from an upstream side. In such an injection molding machine, a molten resin in which a physical foaming agent is dissolved is injected into a mold from the tip of a cylinder, and the physical foaming agent is foamed inside the mold to obtain a molded foam.

In this type of injection molding machine, it is preferable that the physical foaming agent is uniformly and efficiently dissolved by the molten resin in the starvation zone to improve the quality of the molded foam manufactured and that the pressure of the molten resin in the starvation zone is reliably lowered and a sufficient amount of the physical foaming agent can be injected into the cylinder. In order to meet such demands, in an injection molding machine of Japanese Patent No.: JP6570582B, the flight of a screw in a starvation zone and a feeding sone is formed as multiple pieces of flight so that the contact surface of the physical foaming agent with an inert gas and the molten resin is increased to enable uniform and efficient dissolving, and a lead angle of the multiple pieces of flight is set in the range of 10 to 45 degrees to increase the flow rate of the molten resin in the starvation zone and the feeding sone to decrease the pressure of the molten resin in the starvation zone.

BRIEF SUMMARY OF THE INVENTION

Patent Literature 1: JP6570582B

SUMMARY OF INVENTION

Technical Problem

By the way, in a screw-type molded foam manufacturing apparatus such as the injection molding machine mentioned above, with the increase in the number of pieces of the flight in the starvation zone and the feeding zone, it is possible to uniformly and efficiently dissolve the physical foaming agent in the molten resin and obtain high-quality molded foams. However, the increase in the number of pieces of the flight increases the flight pitch and makes the lead angle of the flight more obtuse. When the lead angle of the flight becomes obtuse, the flow rate of the molten resin transported decreases. Moreover, if the internal pressure and resistance pressure of the molten resin accumulated at the tip of the screw are added thereto, the flow rate of the molten resin transported in the starvation zone and the feeding zone will drop significantly.

If the flow rate of the transported molten resin is significantly reduced, it becomes difficult to sufficiently reduce the pressure of the molten resin in the starvation zone to obtain a starvation state in which the necessary physical foaming agent can be injected into the cylinder. Therefore, it is necessary to reduce the amount of the molten resin flowing from the plasticization zone to lower the pressure of the molten resin in the starvation zone and to generate a required level of starvation. However, a decrease in the amount of the molten resin flowing from the plasticization zone causes a decrease in production efficiency. Therefore, there is a need for a manufacturing apparatus that can obtain high-quality molded foams and manufacture molded foams with high production efficiency.

The present invention has been proposed in view of the above-mentioned problems, and an object thereof is to provide a molded foam manufacturing apparatus and a screw for the molded foam manufacturing apparatus capable of uniformly and efficiently dissolving a physical foaming agent in a molten resin to manufacture high-quality molded foams, and preventing a decrease in the flow rate of the molten resin transported in a starvation zone and a feeding zone to manufacture molded foams with high production efficiency.

Solution to Problem

The molded foam manufacturing apparatus of the present invention includes a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, and the number of pieces of the flight of the screw corresponding to the feeding zone is set smaller than the number of a plurality of pieces of the flight of the screw corresponding to the starvation zone.

According to this configuration, since the flight corresponding to the starvation zone is formed as a plurality of pieces or multiple pieces of flights, the physical foaming agent injected in the starvation zone can be uniformly and efficiently dissolved in the molten resin and high-quality molded foams such as, for example, high-magnification molded foams or molded foams with a dense cell structure can be manufactured. In addition, the lead angle of the flight corresponding to the feeding zone is set smaller than the lead angle of the flight corresponding to the starvation zone, and the number of pieces of the flight corresponding to the feeding zone is set smaller than the number of pieces of the flights corresponding to the starvation zone. Therefore, a decrease in the flow rate of the molten resin transported in the starvation zone and the feeding zone can be prevented to obtain a smooth flow of the molten resin, and the pressure of the molten resin in the starvation zone can be reduced to a necessary and sufficient level to reliably realize a starvation state in which an appropriate amount of physical foaming agent can be injected into the cylinder. Therefore, it is no longer necessary to reduce the amount of the molten resin flowing from the plasticization zone in order to lower the pressure of the molten resin in the starvation zone, thereby shortening the metering time and enabling molded foams to be manufactured with high production efficiency. Since a high starvation state can be maintained in the starvation zone due to improvement in the feeding perfor- mance of the molten resin, it is possible to prevent the phenomenon that the molten resin flows back from the injection point of the physical foaming agent and improve vent-up resistance. In addition, since the physical foaming agent can be efficiently dissolved in the molten resin due to improvement in the feeding performance of the molten resin and the use of the plurality of pieces or multiple pieces of flights in the starvation zone, it is possible to shorten the length of the starvation zone, in other words, the total length of the screw and the cylinder, and save the apparatus installation space and reduce the apparatus cost.

In the molded foam manufacturing apparatus of the present invention, a gradual change zone is provided between the starvation zone and the feeding zone, and a lead angle of the flights that are continuously formed from the starvation zone to the feeding zone is gradually changed in the gradual change zone from the lead angle of the flight corresponding to the starvation zone to the lead angle of the flight corresponding to the feeding zone.

According to this configuration, by gradually changing the lead angle in the gradual change zone from the lead angle of the flight corresponding to the starvation zone to the lead angle of the flight corresponding to the feeding zone, it is possible to suppress a decrease in the feeding stability of the molten resin due to an abrupt change in the screw shape. Therefore, the molten resin can flow into the feeding zone more smoothly, and a decrease in the flow rate of the molten resin transported in the starvation zone and the feeding zone can be more reliably prevented.

In the molded foam manufacturing apparatus of the present invention, a spiral progress of flights other than those that are continuous with the flight corresponding to the feeding zone among the flight corresponding to the starva- tion zone terminates in the gradual change zone while decreasing a flight diameter.

According to this configuration, by terminating the spiral progress of the flight other than the flight corresponding to the feeding zone while decreasing the flight diameter in the gradual change zone, it is possible to suppress a decrease in the feeding stability of the molten resin due to an abrupt change in the screw shape. Therefore, the molten resin can flow into the feeding zone more smoothly, and a decrease in the flow rate of the molten resin transported in the starvation zone and the feeding zone can be more reliably prevented.

In the molded foam manufacturing apparatus of the present invention, a lead angle of the flight of the screw corresponding to the feeding zone is set in a range of 0.50 to 0.62 times the lead angle of the flight of the screw corresponding to the starvation zone.

According to this method, it is possible to reliably obtain high-quality molded foams in which the foam cell diameter is small within the predetermined acceptance criteria and there is no or minimal foam breakage in the foam cells, while maintaining a smooth and appropriate flow of the molten resin.

In the molded foam manufacturing apparatus of the present invention, the number of pieces of the flight of the screw corresponding to the feeding zone is set to ½ or less of the number of pieces of the flight of the screw corre- sponding to the starvation zone.

According to this method, it is possible to reliably obtain high-quality molded foams in which the foam cell diameter is small within the predetermined acceptance criteria and there is no or minimal foam breakage in the foam cells, while maintaining a smooth and appropriate flow of the molten resin.

The molded foam manufacturing apparatus of the present invention is an injection molding apparatus in which the screw is installed inside the cylinder so as to be freely movable forward and backward in an axial direction, and the flight corresponding to the feeding zone and the flight corresponding to the starvation zone are the flights arranged to correspond to the feeding zone and the flights arranged to correspond to the starvation zone, respectively, in a state in which the screw has advanced to a downstream side to a maximum extent within the cylinder.

According to this configuration, it is possible to obtain a molded foam manufacturing apparatus capable of uniformly and efficiently dissolving a physical foaming agent in a molten resin to inject and mold high-quality molded foams, and preventing a decrease in the flow rate of the molten resin transported in a starvation zone and a feeding zone to manufacture molded foams with high production efficiency.

The screw for a molded foam manufacturing apparatus of the present invention is a screw used in a molded foam manufacturing apparatus including: a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, and the number of pieces of the flight of the screw corresponding to the feeding zone is set smaller than the number of a plurality of pieces of the flight of the screw corresponding to the starvation zone.

According to this configuration, since the flight corre- sponding to the starvation zone is formed as a plurality of pieces or multiple pieces of flights, the physical foaming agent injected in the starvation zone in the molded foam manufacturing apparatus can be uniformly and efficiently dissolved in the molten resin and high-quality molded foams such as, for example, high-magnification molded foams or molded foams with a dense cell structure can be manufac- tured. In addition, the lead angle of the flight corresponding to the feeding zone is set smaller than the lead angle of the flight corresponding to the starvation zone, and the number of pieces of the flight corresponding to the feeding zone is set smaller than the number of pieces of the flights corre- sponding to the starvation zone. Therefore, a decrease in the flow rate of the molten resin transported in the starvation zone and the feeding zone in the molded foam manufactur- ing apparatus can be prevented to obtain a smooth flow of the molten resin, and the pressure of the molten resin in the starvation zone can be reduced to a necessary and sufficient level to reliably realize a starvation state in which an appropriate amount of physical foaming agent can be injected into the cylinder. Therefore, it is no longer necessary to reduce the amount of the molten resin flowing from the plasticization zone in order to lower the pressure of the molten resin in the starvation zone, thereby shortening the metering time and enabling molded foams to be manufactured with high production efficiency. Since a high starvation state can be maintained in the starvation zone due to improvement in the feeding performance of the molten resin, it is possible to prevent the phenomenon that the molten resin flows back from the injection point of the physical foaming agent in the molded foam manufacturing apparatus and improve vent-up resistance. In addition, since the physical foaming agent can be efficiently dissolved in the molten resin in the molded foam manufacturing apparatus due to improvement in the feeding performance of the molten resin and the use of the plurality of pieces or multiple pieces of flights in the starvation zone, it is possible to shorten the length of the starvation zone, in other words, the total length of the screw and the cylinder, and save the apparatus installation space and reduce the apparatus cost.

Effect of the Invention

According to the present invention, it is possible to uniformly and efficiently dissolve a physical foaming agent in a molten resin to manufacture high-quality molded foams, and prevent a decrease in the flow rate of the molten resin transported in a starvation zone and a feeding zone to manufacture molded foams with high production efficiency.

BRIEF DESCRIPTION OF DRAWINGS

FIG. 4 is a diagram illustrating the contents of a comparative test of molded foams manufactured by the molded foam manufacturing apparatuses of Examples and Comparative Examples.

DETAILED DESCRIPTION OF THE INVENTION EMBODIMENTS

Molded Foam Manufacturing Apparatus of Embodiment

Figure 1:
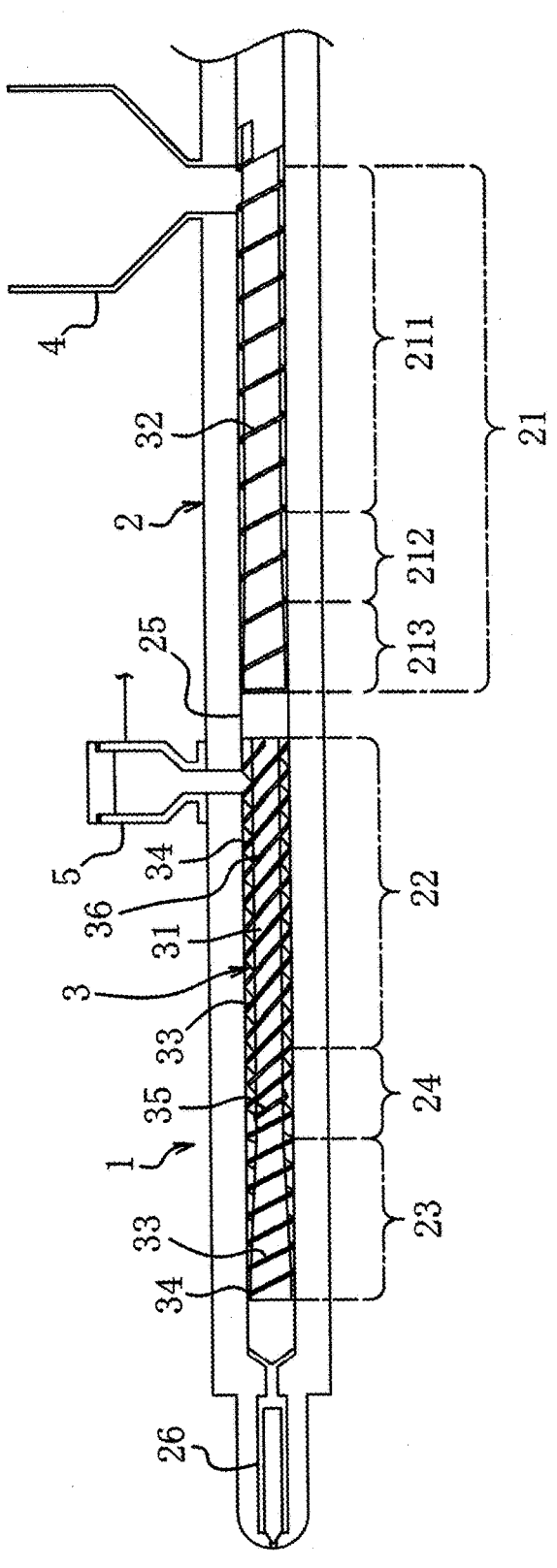
FIG. 1 is a configuration explanatory diagram showing a molded foam manufacturing apparatus according to an embodiment of the present invention.
Figure 2:
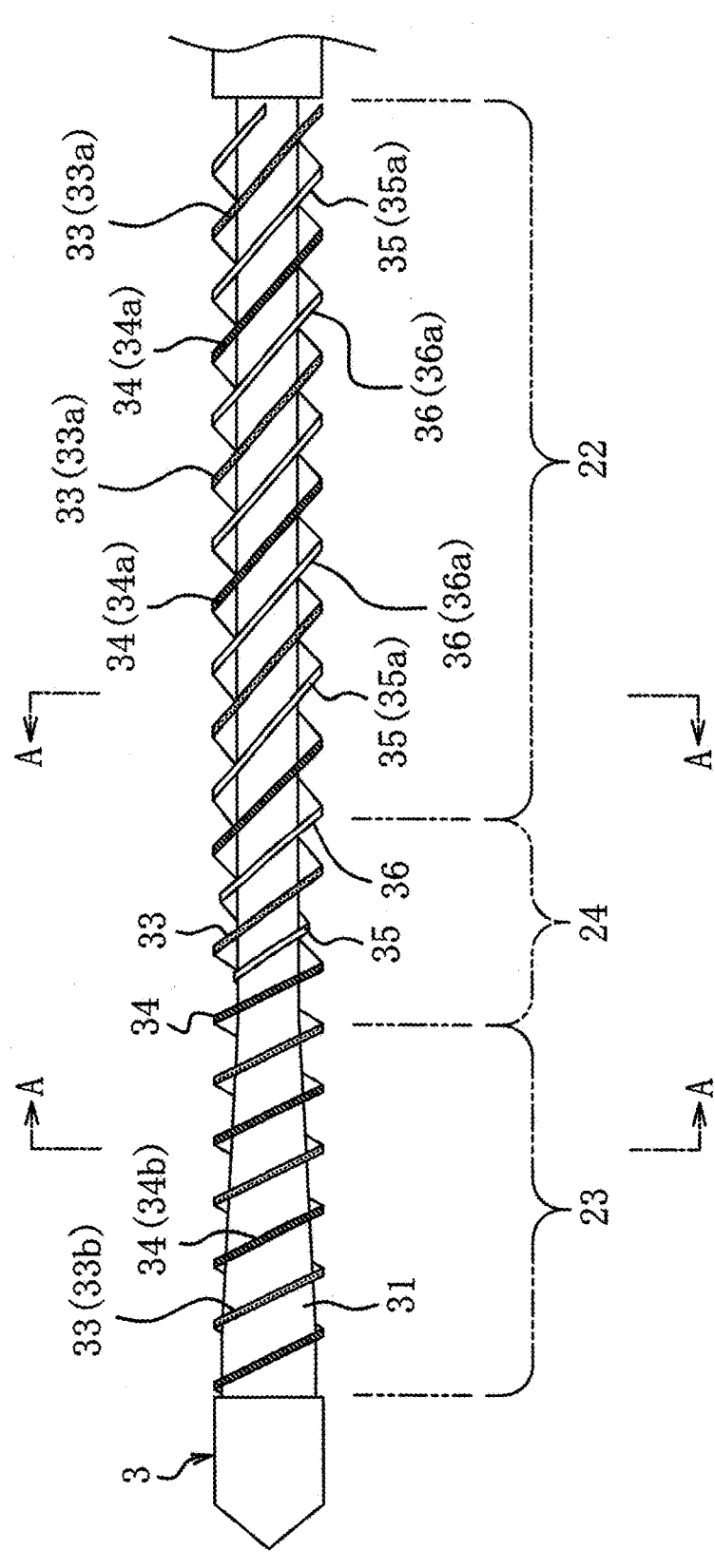
FIG. 2 is a partially enlarged view of a screw in the molded foam manufacturing apparatus of the embodiment.
Figure 3:
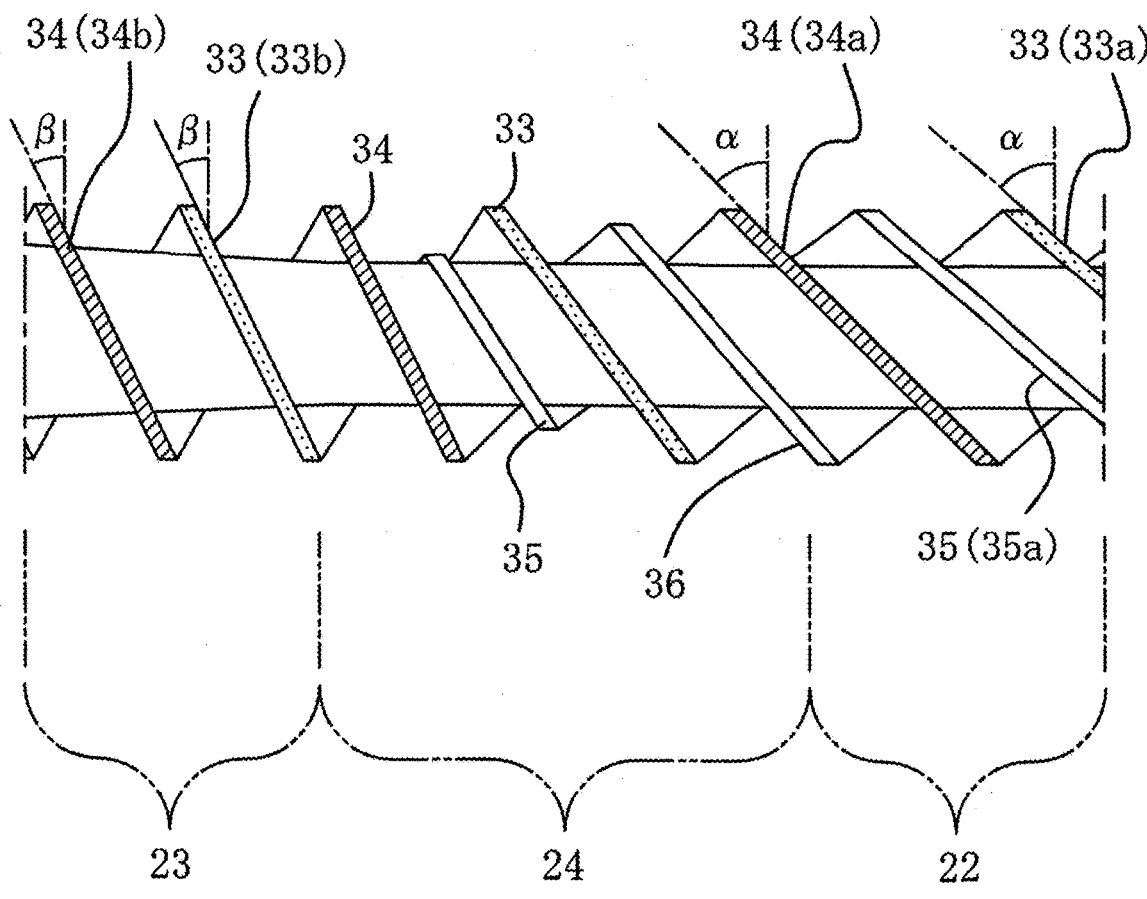
FIG. 3 is an enlarged view of part A-A in FIG. 2.

A molded foam manufacturing apparatus 1 according to the embodiment of the present invention is a screw-type injection molding apparatus that manufactures molded foams in cooperation with a mold clamping device, and performs injection molding using a core-back method. As shown in FIGS. 1 to 3, the molded foam manufacturing apparatus 1 includes a cylinder 2 that can heat a thermoplastic resin supplied therein with a heater (not shown) provided on an outer circumference thereof and injects a molten resin from a nozzle 26, a screw 3 which is installed inside the cylinder 2 so as to be freely rotatable around an axis and movable forward and backward in the axial direction, a hopper 4 that supplies a thermoplastic resin in the form of resin pellets to the inside of the cylinder 2, and a foaming agent supply mechanism 5 that supplies a physical foaming agent to the inside of the cylinder 2.

The cylinder 2 includes a plasticization zone 21 where a thermoplastic resin is plasticized and melted into a molten resin, a starvation zone 22 where the molten resin is put into a starvation state and an injected physical foaming agent is dissolved in the molten resin, and a feeding zone 23 where the molten resin in which the physical foaming agent is dissolved is compressed and metered, the zones being provided in order from the upstream side to the downstream side, and gradual change zone 24 where the lead angle and the number of pieces of the flight of the screw 3 are gradually changed is provided between the starvation zone 22 and the feeding zone 23. Note that "upstream side" and "downstream side" respectively mean the upstream side and downstream side in the flow direction of the molten resin flowing inside the cylinder 2, and the "starvation state" means a state where the density of the molten resin is reduced.

In the plasticization zone 21, a supply zone 211, a compression zone 212, and a metering zone 213 are provided in this order from the upstream side to the downstream side. In the supply zone 211, resin pellets of the thermoplastic resin supplied from the hopper 4 are transported to the front side which is the injection side, by the rotation of the screw 3, and residual heat is applied to the resin pellets by the heated inner wall of the cylinder 2. In the compression zone 212, the thermoplastic resin transported to the front side is plasticized and melted by shear kneading, and the molten resin is compressed. In the metering zone 213, the density of the compressed molten resin is made uniform and kept constant.

The screw 3 disposed in a portion corresponding to the plasticization zone 21 has a single flight structure in which one flight 32 is formed on the outer circumference of a shaft 31 in a spirally inclined manner. Further, in order to reduce the density of the molten resin in the starvation zone 22, a seal zone 25 for limiting the amount of molten resin supplied to the downstream side is provided between the plasticization zone 21 and the starvation zone 22.

Thermoplastic resins appropriate within an applicable range can be used as the thermoplastic resin supplied in the supply zone 211 of the plasticization zone 21. For example, thermoplastic resins such as polypropylene, polymethyl methacrylate, polyamide, polyethylene, polycarbonate, polybutylene terephthalate, amorphous polyolefin, polyetherimide, polyethylene terephthalate, polyetheretherketone, ABS resin (acrylonitrile-butadiene-styrene copolymer resin), polyphenylene sulfide, polyamideimide, polylactic acid, or polycaprolactone, and composite materials thereof can be used, and two or more types may be used in combination. Further, these thermoplastic resins may be kneaded with various inorganic fillers such as glass fibers, talc, carbon fibers, or ceramics, and organic fillers such as cellulose nanofibers, cellulose, or wood flour. Further, the thermoplastic resin may contain various additives as necessary, such as an inorganic filler that functions as a foaming nucleating agent, an organic filler, an additive that increases melt tension, and the like.

A foaming agent supply mechanism 5 is provided near the upstream end of the starvation zone 22, and the foaming agent supply mechanism 5 pressurizes a physical foaming agent such as an inert gas such as carbon dioxide or nitrogen to a predetermined pressure and supplies the physical foaming agent to the inside of the cylinder 2 in the starvation zone 22. In the starvation zone 22, the physical foaming agent supplied by the foaming agent supply mechanism 5 comes into contact with the molten resin whose density has decreased and is dissolved in the molten resin. Further, the flights 33a, 34a, 35a, and 36a of the screw 3 corresponding to the starvation zone 22, more specifically, the flights 33a, 34a, 35a, and 36a of the screw 3 arranged in the portion corresponding to the starvation zone 22 in a state where the screw 3 has advanced to the downstream side to the maximum extent within the cylinder 2 have a multi-flight structure in which a plurality of pieces (four pieces in the illustrated example) of flight are formed on the outer circumference of the shaft 31 in a spirally inclined manner.

In the feeding zone 23, the molten resin in which the physical foaming agent has been dissolved is compressed, and the screw 3 is moved backward to perform metering. Incidentally, during injection, the screw 3 is moved forward to inject the molten resin in which the physical foaming agent is dissolved from the tip of the cylinder 2 into the mold clamping device. In addition, the flights 33b and 34b of the screw 3 corresponding to the feeding zone 23 in the illustrated example, more specifically, the flights 33b and 34b of the screw 3 arranged in the portion corresponding to the feeding zone 23 in a state where the screw 3 has advanced to the downstream side to the maximum extent within the cylinder 2 have a multi-flight structure in which a plurality of pieces (two pieces in the illustrated example) of flight are formed on the outer circumference of the shaft 31 in a spirally inclined manner. Note that the screw 3 disposed in the portion corresponding to the feeding zone 23 may preferably have a single flight structure in which one flight is formed on the outer circumference of the shaft 31 in a spirally inclined manner.

The lead angles of the flight 33b and the flight 34b of the screw 3 corresponding to the feeding zone 23 are set to the same lead angle β, the lead angles of the flight 33a and the flight 34a of the screw 3 corresponding to the starvation zone 22 are set to the same lead angle α, and the lead angle s of the flights 33b and 34b of the screw 3 corresponding to the feeding zone 23 is set smaller than the lead angle α of the flights 33a and 34a of the screw 3 corresponding to the starvation zone 22. Note that the lead angles of the flights 35a and 36a of the screw 3 corresponding to the starvation zone 22 are also set to the same angle as the lead angle α of the flights 33a and 34a. It is suitable to set the lead angle s of the flight of the screw 3 corresponding to the feeding zone 23 in the range of 0.50 to 0.62 times the lead angle α of the flight of the screw 3 corresponding to the starvation zone 22 because it is possible to reliably obtain high-quality molded foams in which the foam cell diameter is small within the predetermined acceptance criteria and there is no or minimal foam breakage in the foam cells, while maintaining a smooth and appropriate flow of the molten resin.

The number of pieces of the flights 33b and 34b of the screw 3 corresponding to the feeding zone 23 is set smaller than the number of pieces of the flights 33a, 34a, 35a, and 36a of the screw 3 corresponding to the starvation zone 22. In the present embodiment, the number of pieces of the flights 33b and 34b of the screw 3 corresponding to the feeding zone 23 is two, and the number of pieces of the flights 33a, 34a, 35a, and 36a of the screw 3 corresponding to the starvation zone 22 is four. It is suitable to set the number of pieces of the flight of the screw 3 corresponding to this feeding zone 23 to be ½ or less of the number of pieces of the flight of the screw 3 corresponding to the starvation zone 22, because it is possible to reliably obtain high-quality molded foams in which the foam cell diameter is small within the predetermined acceptance criteria and there is no or minimal foam breakage in the foam cells while maintaining a smooth and appropriate flow of the molten resin.

In the gradual change zone 24, the lead angles of the flights 33 and 34 that are continuously formed from the starvation zone 22 to the feeding zone 23 change gradually from the lead angle α of the flights 33a and 34a corresponding to the starvation zone 22 to the lead angle β of the flights 33b and 34b corresponds to the feeding zone 23. Further, in the gradual change zone 24, the spiral progress of the flights 35a and 36a other than the flights 33a and 34a that are continuous with the flights 33b and 34b corresponding to the feeding zone 23 among the plurality of pieces of flights 33a, 34a, 35a, and 36a corresponding to the starvation zone 22 are formed to terminate while decreasing the flight diameter.

A mold clamping device for clamping the mold is provided on the resin injection side of the molded foam manufacturing apparatus 1 of the injection molding apparatus, and a control device for controlling the operations of the molded foam manufacturing apparatus 1 and the mold clamping device is provided, whereby the entire manufacturing facility is configured. The molded foam manufacturing apparatus 1 of the embodiment constitutes a manufacturing facility that moves the screw 3 in the axial direction and performs injection molding using a core-back method. However, the molded foam manufacturing apparatus of the present invention is not limited to an injection molding apparatus, and may be a screw-type extrusion molding apparatus, for example, in which a die is provided at the tip of a cylinder and a screw is installed inside the cylinder so as to be freely rotatable around the axis.

In the molded foam manufacturing apparatus 1 of the present embodiment, when the flight corresponding to the starvation zone 22 is formed as a plurality of pieces or multiple pieces of flights 33, 34, 35, and 36, the physical foaming agent injected in the starvation zone 22 can be uniformly and efficiently dissolved in the molten resin, and high-quality molded foams such as, for example, high-magnification molded foams or molded foams with a dense cell structure can be manufactured.

The lead angle β of the flights 33b and 34b corresponding to the feeding zone 23 is set smaller than the lead angle α of the flights 33a, 34a, 35a, and 36a corresponding to the starvation zone 22, and the number of pieces of the flight 33b and 34b corresponding to the feeding zone 23 is set smaller than the number of pieces of the flights 33a, 34a, 35a, and 36a corresponding to the starvation zone 22. Therefore, a decrease in the flow rate of the molten resin transported in the starvation zone 22 and the feeding zone 23 can be prevented to obtain a smooth flow of the molten resin, and the pressure of the molten resin in the starvation zone 22 can be reduced to a necessary and sufficient level to reliably realize a starvation state in which an appropriate amount of physical foaming agent can be injected into the cylinder 2. Therefore, it is no longer necessary to reduce the amount of the molten resin flowing from the plasticization zone 21 in order to lower the pressure of the molten resin in the starvation zone 22, thereby shortening the metering time and enabling molded foams to be manufactured with high production efficiency.

Since a high starvation state can be maintained in the starvation zone 22 due to improvement in the feeding performance of the molten resin, it is possible to prevent the phenomenon that the molten resin flows back from the injection point of the physical foaming agent and improve vent-up resistance. In addition, since the physical foaming agent can be efficiently dissolved in the molten resin due to improvement in the feeding performance of the molten resin and the use of the plurality of pieces or multiple pieces of flights 33a, 34a, 35a, and 36a in the starvation zone 22, it is possible to shorten the length of the starvation zone 22, in other words, the total length of the screw 3 and the cylinder 2, and save the apparatus installation space and reduce the apparatus cost.

By gradually changing the lead angle in the gradual change zone 24 from the lead angle α of the flights 33a, 34a, 35a, and 36a corresponding to the starvation zone 22 to the lead angle β of the flights 33b and 34b corresponding to the feeding zone 23, or terminating the spiral progress of the flights 35a and 36a other than the flights 33b and 34b corresponding to the feeding zone 23 while decreasing the flight diameter in the gradual change zone 24, it is possible to suppress a decrease in the feeding stability of the molten resin due to an abrupt change in the screw shape. Therefore, the molten resin can flow into the feeding zone 23 more smoothly, and a decrease in the flow rate of the molten resin transported in the starvation zone 22 and the feeding zone 23 can be more reliably prevented.

SCOPE OF INCLUSION OF INVENTION DISCLOSED IN PRESENT SPECIFICATION

The invention disclosed in this specification includes, in addition to the configurations according to the respective inventions and embodiments listed as inventions, a matter defined by modifying any of these partial configurations into other configurations disclosed in this specification within an applicable range, a matter defined by adding any other configurations disclosed in this specification to these partial configurations, or a matter defined into a generic concept by cancelling any of these partial configurations within a limit that achieves a partial operational advantage. The invention disclosed in this specification further covers modifications and additions described below.

For example, the inner diameter of the cylinder 2, which corresponds to the outer diameter of the screw 3 or a basic flight diameter, can be set as appropriate within the spirit of the present invention, and can be set, for example, from 10 mm to 300 mm, preferably from 20 mm to 245 mm, and more preferably from 30 mm to 190 mm. Further, the angular difference between the lead angle β of the flight in the feeding zone 23 and the lead angle α of the flight in the starvation zone 22 can be set as appropriate within the spirit of the present invention, and can be set, for example, from 2 degrees to 50 degrees, preferably from 10 degrees to 40 degrees, more preferably from 15 degrees to 25 degrees.

In the screw 3 of the molded foam manufacturing apparatus 1 of the above-described embodiment, the number of pieces (four pieces) of the flight in the starvation zone 22 is reduced to the number of pieces (two pieces) of the flight in the feeding zone 23. However, the number of pieces of the flight can be reduced as appropriate within the spirit of the present invention, for example, the number of pieces (six pieces) of the flight in the starvation zone may be reduced to the number of pieces (three pieces) of the flight in the feeding zone, or the number of pieces (two pieces) of the flight in the starvation zone may be reduced to the number of pieces (one piece) of the flight in the feeding zone. Even in the modification example in which the number of pieces is reduced, it is preferable to provide the gradual change zone between the starvation zone and the feeding zone so that the lead angle of the flights that are continuously formed from the starvation zone to the feeding zone is gradually changed from the lead angle of the flight corresponding to the starvation zone to the lead angle of the flight corresponding to the feeding zone, and the spiral progress of the flight other than the flights that are continuous with the flight corresponding to the feeding zone among the flights corresponding to the starvation zone terminates while decreasing the flight diameter.

In the molded foam manufacturing apparatus of the present invention, in the starvation zone, the lead angle of the flight of the screw corresponding to a downstream section may be set smaller than the lead angle of the flight of the screw corresponding to an upstream section, and the number of pieces of the plurality of pieces of flight of the screw corresponding to the downstream section may be set smaller than the number of pieces of the plurality of pieces of flight of the screw corresponding to the upstream section. For example, the number of pieces (eight pieces) of the flight in the upstream section may be reduced to the number of pieces (four pieces) of the flight in the downstream section. Alternatively, the number of pieces of the flight may be reduced in multiple stages such that the number of pieces (eight pieces) of the flight in a first upstream section may be reduced to the number of pieces (four pieces) of the flight in a first downstream section, and the number of pieces (four pieces) of the flight in a second upstream section corresponding to the first downstream section may be reduced to the number of pieces (two pieces) of the flight in a second downstream section. Even in the modification example in which the number of pieces is reduced, it is preferable to provide a gradual change section between the upstream section and the downstream section so that the lead angle of the flights that are continuously formed from the upstream section to the downstream section is gradually changed from the lead angle of the flight corresponding to the upstream section to the lead angle of the flight corresponding to the downstream section, and the spiral progress of the flight other than the flights that are continuous with the flight corresponding to the downstream section among the flights corresponding to the upstream section terminates while decreasing the flight diameter.

EXAMPLE AND COMPARATIVE EXAMPLE

Next, a comparative test of a molded foam manufactured by a molded foam manufacturing apparatus according to an example of the present invention and a molded foam manufactured by a molded foam manufactured by a comparative example will be explained. The thermoplastic resin used in the comparative test for Examples and Comparative Examples was a mixture of polypropylene (manufactured by Idemitsu Lion Composite, 4700G) with 20% talc. The molded foam manufacturing apparatus used was a screw-type injection molding apparatus that manufactures a molded foam in cooperation with a mold clamping device, and injection molding was performed using a core-back method. The shape of the molded foam of the test pieces molded in Examples and Comparative Examples was a square plate shape, and the thickness of the molded foam of each test piece was kept constant at 2 mm. The size of the molded foam product of each test piece was varied in the range of 200 mm square to 500 mm square in accordance with the diameter of the screw cylinder.

Regarding the quality of the molded foams of the test pieces molded in Examples and Comparative Examples, the foam cell size (average cell diameter of foam cells) was evaluated as acceptable when the average cell diameter of foam cells at the gate part, center part, and flow end part was 40 μm or less, and the uniformity of the foam cells was evaluated by visually checking through the product and checking the presence or absence of foam breakage (see FIG. 4). Regarding the column of foam cell size in FIG. 4, "O" indicates that there is no foam breakage as determined by visual confirmation, and "X" indicates that foam breakage occurred as determined by visual confirmation.

Example 1

In Example 1, the cylinder had an inner diameter (diameter) of 56 mm, and an injection molding apparatus configured with a screw having basically the same flight diameter as the cylinder diameter was used. Four pieces of flight were formed over the entire region corresponding to the starvation zone (section length: 355 mm) of the screw in the maximum advanced state, and the lead angle of these four pieces of flight was 49 degrees. Two pieces of flights were formed in the region corresponding to the feeding zone (section length: 195 mm) of the screw in the maximum advanced state, the lead angle of these two pieces of flights was 30 degrees, which was 0.61 times the lead angle of the flight corresponding to the starvation zone. In addition, a gradual change zone (section length: 101 mm) was provided between the starvation zone and the feeding zone, and the shape was smoothed so that the stable feeding of the resin would not be impaired by an abrupt change in the screw shape. A mold that could form a 200 mm square plate with a thickness of 2 mm was used, and injection filling was performed at an injection speed of 50 mm/s after plasticization and metering under the conditions of pressure of physical foaming agent with nitrogen gas: 8 Mpa, screw back pressure: 10 MPa, resin temperature: 180 to 210° C., and mold temperature: 50° C. After applying a holding pressure of 20 MPa for 2 seconds, the mold was opened by 4 mm and core-back foaming was performed three times.

When the cell diameter of the molded product of the molded foam molded in Example 1 was evaluated using a cross-sectional SEM, the average cell diameter was as small as 22 μm, which met the acceptance criteria and was good. Moreover, no foam breakage of the foam cells was observed. Furthermore, when the molded foam of the same test piece was continuously molded with 100 shots, no abnormalities were observed, and good feeding performance of the molten resin without vent-up was obtained.

Example 2

In Example 2, the cylinder had an inner diameter (diameter) of 80 mm, and an injection molding apparatus configured with a screw having basically the same flight diameter as the cylinder diameter was used. Four pieces of flight were formed over the entire region corresponding to the starvation zone (section length: 507 mm) of the screw in the maximum advanced state, and the lead angle of these four pieces of flight was 49 degrees. Two pieces of flights were formed in the region corresponding to the feeding zone (section length: 310 mm) of the screw in the maximum advanced state, the lead angle of these two pieces of flights was 30 degrees, which was 0.61 times the lead angle of the flight corresponding to the starvation zone. In addition, a gradual change zone (section length: 144 mm) was provided between the starvation zone and the feeding zone, and the shape was smoothed so that the stable feeding of the resin would not be impaired by an abrupt change in the screw shape. A mold that could form a 500 mm square plate with a thickness of 2 mm was used, and injection filling was performed at an injection speed of 50 mm/s after plasticization and metering under the conditions of pressure of physical foaming agent with nitrogen gas: 8 Mpa, screw back pressure: 10 MPa, resin temperature: 180 to 210° C., and mold temperature: 50° C. After applying a holding pressure of 20 MPa for 2 seconds, the mold was opened by 4 mm and core-back foaming was performed three times.

When the cell diameter of the molded product of the molded foam molded in Example 2 was evaluated using a cross-sectional SEM, the average cell diameter was as small as 25 μm, which met the acceptance criteria and was good. Moreover, no foam breakage of the foam cells was observed. Furthermore, when the molded foam of the same test piece was continuously molded with 100 shots, no abnormalities were observed, and good feeding performance of the molten resin without vent-up was obtained.

Comparative Example 1

In Comparative Example 1, the cylinder had an inner diameter (diameter) of 56 mm, and an injection molding apparatus configured with a screw having basically the same flight diameter as the cylinder diameter was used. There is no gradual change zone between the region corresponding to the starvation zone (section length: 456 mm) of the screw in the maximum advanced state and the region corresponding to the feeding zone (section length: 195 mm), and four pieces of flights were formed over the entire region, and the lead angle of these four pieces of flights was 49 degrees. Core-back foaming was performed using the same conditions as Example 1 except for the above.

When the cell diameter of the molded foam product molded in Comparative Example 1 was evaluated using a cross-sectional SEM, the average cell diameter was 41 μm, which was slightly enlarged. This is presumed to be because the lead angle of the flight in the feeding zone is larger than in Example 1, the feeding performance of the molten resin is reduced, whereby the amount of resin in the starvation zone increases and the solubility of the physical foaming agent is reduced. In addition, foam breakage of the foam cells was visually confirmed.

Comparative Example 2

In Comparative Example 2, in order to reduce the amount of resin in the starvation zone and increase the solubility of the physical foaming agent, the amount of resin fed from a hopper (not shown) by a quantitative feeder was reduced by approximately 25% compared to Comparative Example 1. Core-back foaming was performed using the same apparatus configuration and conditions as Comparative Example 1 except for the above. When the cell diameter of the molded foam product molded in Comparative Example 2 was evaluated using a cross-sectional SEM, the average cell diameter was as small as 26 μm, which was good. However, due to the limited resin supply amount, the metering time was delayed by +5 seconds compared to Comparative Example 1.

INDUSTRIAL APPLICABILITY

The present invention can be utilized when manufacturing resin molded foams.

The invention claimed is:
1. A molded foam manufacturing apparatus comprising:
a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, number of pieces of the flight of the screw corresponding to the feeding zone is set smaller than number of a plurality of pieces of the flight of the screw corresponding to the starvation zone, a gradual change zone is provided between the starvation zone and the feeding zone, and a lead angle of the flights that are continuously formed from the starvation zone to the feeding zone is gradually changed in the gradual change zone from the lead angle of the flight corresponding to the starvation zone to the lead angle of the flight corresponding to the feeding zone.

2. The molded foam manufacturing apparatus according to claim 1, wherein a spiral progress of flights other than those that are continuous with the flight corresponding to the feeding zone among the flight corresponding to the starvation zone terminates in the gradual change zone while decreasing a flight diameter.

3. A molded foam manufacturing apparatus comprising:

a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, number of pieces of the flight of the screw corresponding to the feeding zone is set smaller than number of a plurality of pieces of the flight of the screw corresponding to the starvation zone, and a lead angle of the flight of the screw corresponding to the feeding zone is set in a range of 0.50 to 0.62 times the lead angle of the flight of the screw corresponding to the starvation zone.

4. The molded foam manufacturing apparatus according to claim 3, wherein a gradual change zone is provided between the starvation zone and the feeding zone, a lead angle of the flights that are continuously formed from the starvation zone to the feeding zone is gradually changed in the gradual change zone from the lead angle of the flight corresponding to the starvation zone to the lead angle of the flight corresponding to the feeding zone, and a spiral progress of flights other than those that are continuous with the flight corresponding to the feeding zone among the flight corresponding to the starvation zone terminates in the gradual change zone while decreasing a flight diameter.

5. A molded foam manufacturing apparatus comprising:

a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, number of pieces of the flight of the screw corresponding to the feeding zone is set smaller than number of a plurality of pieces of the flight of the screw corresponding to the starvation zone, the number of pieces of the flight of the screw corresponding to the feeding zone is set to ½ or less of the number of pieces of the flight of the screw corresponding to the starvation zone.

6. The molded foam manufacturing apparatus according to claim 5, wherein a gradual change zone is provided between the starvation zone and the feeding zone, a lead angle of the flights that are continuously formed from the starvation zone to the feeding zone is gradually changed in the gradual change zone from the lead angle of the flight corresponding to the starvation zone to the lead angle of the flight corresponding to the feeding zone, and a spiral progress of flights other than those that are continuous with the flight corresponding to the feeding zone among the flight corresponding to the starvation zone terminates in the gradual change zone while decreasing a flight diameter.

7. A molded foam manufacturing apparatus comprising:

a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, number of pieces of the flight of the screw corresponding to the feeding zone is set smaller than number of a plurality of pieces of the flight of the screw corresponding to the starvation zone, the molded foam manufacturing apparatus is an injection molding apparatus in which the screw is installed inside the cylinder so as to be freely movable forward and backward in an axial direction, and the flight corresponding to the feeding zone and the flight corresponding to the starvation zone are the flights arranged to correspond to the feeding zone and the flights arranged to correspond to the starvation zone, respectively, in a state in which the screw has advanced to a downstream side to a maximum extent within the cylinder.

8. The molded foam manufacturing apparatus according to claim 7, wherein a gradual change zone is provided between the starvation zone and the feeding zone, a lead angle of the flights that are continuously formed from the starvation zone to the feeding zone is gradually changed in the gradual change zone from the lead angle of the flight corresponding to the starvation zone to the lead angle of the flight corresponding to the feeding zone, and a spiral progress of flights other than those that are continuous with the flight corresponding to the feeding zone among the flight corresponding to the starvation zone terminates in the gradual change zone while decreasing a flight diameter.

9. A screw used in a molded foam manufacturing apparatus comprising:

a cylinder in which a plasticization zone where a thermoplastic resin is plasticized and melted into a molten resin, a starvation zone where the molten resin is put into a starvation state and an injected physical foaming agent is dissolved in the molten resin, and a feeding zone where the molten resin in which the physical foaming agent is dissolved is compressed and metered are provided in this order from an upstream side; and a screw that is installed inside the cylinder so as to be freely rotatable around an axis of the cylinder and has flights formed in a spiral shape on an outer circumference of a shaft, wherein a lead angle of the flight of the screw corresponding to the feeding zone is set smaller than a lead angle of the flight of the screw corresponding to the starvation zone, number of pieces of the flight of the screw corresponding to the feeding zone is set smaller than number of a plurality of pieces of the flight of the screw corresponding to the starvation zone, a gradual change zone is provided between the starvation zone and the feeding zone, and a lead angle of the flights that are continuously formed from the starvation zone to the feeding zone is gradually changed in the gradual change zone from the lead angle of the flight corresponding to the starvation zone to the lead angle of the flight corresponding to the feeding zone.

10. The screw according to claim 9, wherein a spiral progress of flights other than those that are continuous with the flight corresponding to the feeding zone among the flight corresponding to the starvation zone terminates in the gradual change zone while decreasing a flight diameter.

\* \* \* \* \*